United States Patent
Gray et al.

(10) Patent No.: US 9,905,033 B1
(45) Date of Patent: Feb. 27, 2018

(54) ADJUSTING GRAPHICAL CHARACTERISTICS FOR RECOGNITION INTERFACES

(71) Applicant: Amazon Technologies, Inc., Reno, NV (US)

(72) Inventors: Timothy Thomas Gray, Seattle, WA (US); Charles Eugene Cummins, Seattle, WA (US); Angela Kathleen Warren, Shoreline, WA (US); Marc Anthony Salazar, Seattle, WA (US); Suzan Marashi, Seattle, WA (US); Steven Michael Sommer, Bellevue, WA (US); Russell Edward Glaser, Woodinville, WA (US); Forrest Elliott, Seattle, WA (US); Tito Pagan, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 605 days.

(21) Appl. No.: 14/137,709

(22) Filed: Dec. 20, 2013

(51) Int. Cl.
*G06T 13/00* (2011.01)
*G06K 9/00* (2006.01)
*G06T 13/40* (2011.01)
*G06T 13/80* (2011.01)

(52) U.S. Cl.
CPC .......... *G06T 13/00* (2013.01); *G06K 9/00671* (2013.01); *G06T 13/40* (2013.01); *G06T 13/80* (2013.01)

(58) Field of Classification Search
CPC .......... G06T 13/40; G06T 13/00; G06T 13/80
See application file for complete search history.

(56) References Cited

U.S. PATENT DOCUMENTS

| | | | | |
|---|---|---|---|---|
| 9,123,338 | B1* | 9/2015 | Sanders | G10L 15/265 |
| 2006/0284879 | A1* | 12/2006 | Nagata | G01C 21/3638 |
| | | | | 345/582 |
| 2008/0120573 | A1* | 5/2008 | Gilbert | G06F 3/04817 |
| | | | | 715/835 |
| 2008/0281168 | A1* | 11/2008 | Gibson | A61B 5/0205 |
| | | | | 600/301 |

(Continued)

OTHER PUBLICATIONS

Roh. "Accurate object contour tracking based on boundary edge selection", Science Direct, Pattern Recognition, vol. 40, Issue 3, Mar. 2007, pp. 931-943.*

*Primary Examiner* — Tapas Mazumder
(74) *Attorney, Agent, or Firm* — Pierce Atwood LLP

(57) ABSTRACT

A computing device can include a recognition mode interface utilizing graphical elements, such as virtual fireflies, to indicate recognized or identified objects. The fireflies can be animated to move across a display, and the fireflies can create bounding boxes around visual representations of objects as the objects are recognized. In some cases, the object might be of a type that has specific meaning or information to be conveyed to a user. In such cases, the fireflies might be displayed with a particular size, shape, or color to convey that information. The fireflies also can be configured to form shapes or patterns in order to convey other types of information to a user, such as where audio is being recognized, light is sufficient for image capture, and the like. Other types of information can be conveyed as well via altering characteristics of the fireflies.

19 Claims, 11 Drawing Sheets

(56) References Cited

U.S. PATENT DOCUMENTS

| | | | |
|---|---|---|---|
| 2010/0183207 A1* | 7/2010 | Sakaguchi | A61B 6/507 382/128 |
| 2010/0259633 A1* | 10/2010 | Kii | G06F 3/038 348/222.1 |
| 2011/0134269 A1* | 6/2011 | Kim | H04N 5/23293 348/222.1 |
| 2011/0285525 A1* | 11/2011 | Ishibashi | G09F 21/04 340/461 |
| 2012/0149460 A1* | 6/2012 | McInerny | G07F 17/3267 463/25 |

* cited by examiner

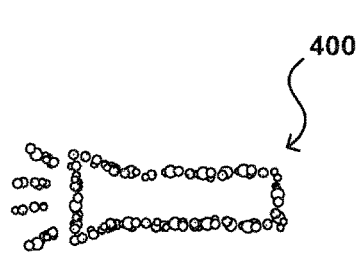
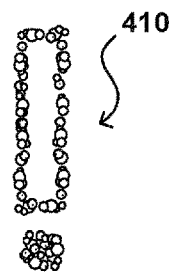
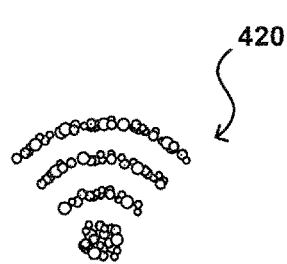
FIG. 4(a)  FIG. 4(b)  FIG. 4(c)
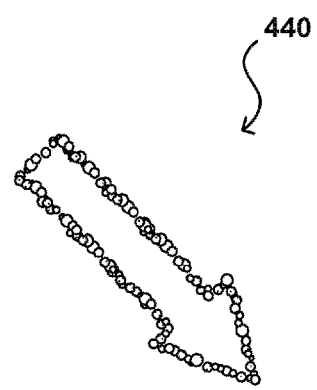
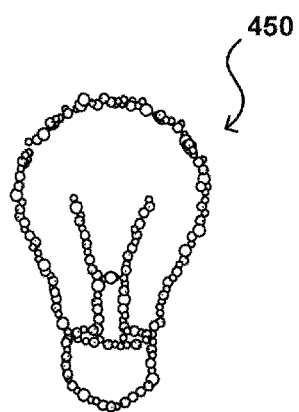
FIG. 4(d)  FIG. 4(e)  FIG. 4(f)
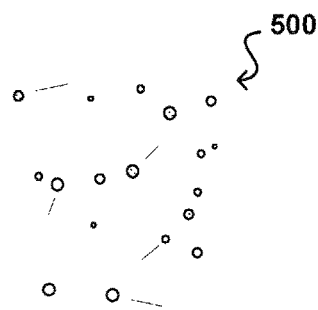
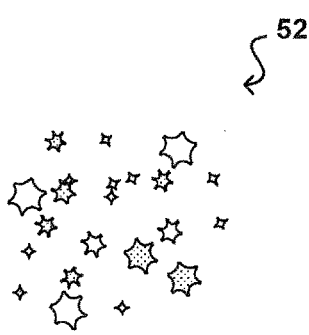
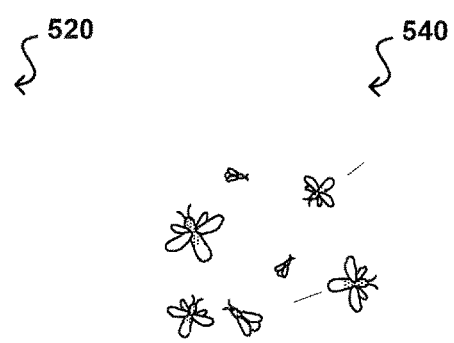
FIG. 5(a)  FIG. 5(b)  FIG. 5(c)

ADJUSTING GRAPHICAL CHARACTERISTICS FOR RECOGNITION INTERFACES

CROSS-REFERENCE TO RELATED APPLICATIONS

This application claims priority to U.S. Provisional Patent Application Ser. No. 61/821,677, entitled "Mobile Device User Interface—Camera," filed May 9, 2013, which is hereby incorporated herein by reference, in its entirety and for all purposes.

BACKGROUND

People are increasingly utilizing portable electronic devices to perform a wide variety of tasks. As an example, people can utilize a camera of such a device to capture an image of an object, whereby the device can attempt to recognize something about that object. For example, a user can capture an image of a book and upload that image to a server that is able to execute an image recognition algorithm on that image to attempt to identify the book. The user can then receive information about that book if identified. Such a process is relatively slow, as a user must capture an image and that image must be uploaded to a server for analysis. Further, the user often will not know whether the image was sufficient until after the server has an opportunity to analyze the image, which then can frustrate the user as the user may have to wait for a result only to find out that the user has to repeat the process because the previous attempt was unsuccessful. Further, there might be multiple objects recognized from an image, and the user may not be able to determine ahead of time which of the objects in the image is being identified, as well as whether the user needs to adjust the camera or device in order to identify the determined object.

BRIEF DESCRIPTION OF THE DRAWINGS

Various embodiments in accordance with the present disclosure will be described with reference to the drawings, in which:

FIGS. 4(a), 4(b), 4(c), 4(d), 4(e), and 4(f) illustrate example configurations that can be formed by fireflies in accordance with various embodiments;

FIGS. 5(a), 5(b), and 5(c) illustrate an example interface approach that can be used to provide information to a user in accordance with various embodiments;

DETAILED DESCRIPTION

Figure 1A:
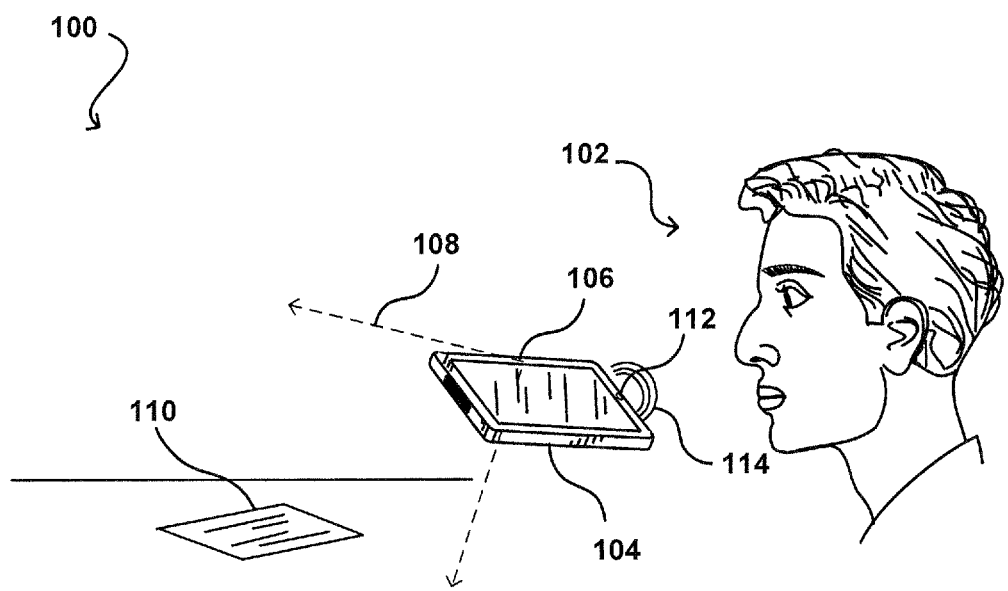
FIGS. 1(a) and 1(b) illustrates an example of a user using a portable computing device to capture an image of an object that can be utilized in accordance with various embodiments.

Systems and methods in accordance with various embodiments of the present disclosure may overcome one or more of the aforementioned and other deficiencies experienced in conventional approaches to providing input to, and/or output from, an electronic device. In particular, various embodiments enable a computing device to analyze information, such as sensor data captured by one or more sensors of the computing device to attempt to identify one or more objects represented in the information. Sensor data can include, for example, images or video data captured by a camera, audio captured by a microphone, position data captured by a global positioning system, and any other appropriate data capable of being acquired by one or more sensors (or other such components) of a computing device. The objects represented can include tangible and/or intangible objects, such as may include, for example, text strings, bar codes, songs, movies, products, locations, people, and other types of items, events, and/or occurrences. Various embodiments also provide an interface that enables the device to convey which objects represented in the information have been recognized, such as by displaying a set of virtual "fireflies" over a live view of image information (e.g., video) being captured by the device. As visual representations of objects are recognized, the fireflies can move towards those visual representations, form shapes, or otherwise adjust one or more aspects to indicate the recognition, such as by creating a bounding box around each such representation. The fireflies can be used to communicate various other types of information as well. For example, information can be communicated to a user using various aspects of the fireflies, such as their size, shape, color, density, speed of motion, type of motion, type of animation, and the like. The fireflies can take various forms with varying appearance as well, as may be configurable by a user. In many examples, the fireflies can be grouped into certain shapes to convey information to a user, such as a question mark if the device is unable to locate any recognizable objects or a flashlight shape if more light is needed for image capture and/or analysis. The fireflies also can be configured to gravitate towards things that are likely candidates for recognized objects, in order to convey to a user that one or more visual representations of objects in the view are being analyzed. In some embodiments, the fireflies might form a circle when analyzing audio data, where the color, brightness, action, or other aspect of the fireflies might adjust over time to indicate that the process is being performed. The fireflies might also be configured to flash, blink, dance, hop, and/or otherwise move to the beat of the audio or other acoustic fingerprint, to help indicate that the audio has been detected by the device, and to indicate that the device is analyzing a particular type of audio.

Various other applications, processes, and uses are presented below with respect to the various embodiments.

FIG. 1(a) illustrates an example situation 100 wherein a user 102 is interacting with a computing device 104. Although a portable computing device (e.g., a smart phone, an c-book reader, or tablet computer) is shown, it should be understood that various other types of electronic devices that are capable of determining and processing input can be used in accordance with various embodiments discussed herein. These devices can include, for example, desktop computers, notebook computers, personal data assistants, cellular phones, video gaming consoles or controllers, smart televisions, a wearable computer (e.g., a smart watch or glasses), and portable media players, among others. In this example, the computing device 104 has at least one image capture element 106, such as a camera or camera sensor, operable to perform functions such as image and/or video capture. Each image capture element may be, for example, a charge-coupled device (CCD), a motion detection sensor, or an infrared sensor, or can utilize another appropriate image capturing technology. In this example, the user 102 is interested in obtaining information about a particular document 110. This could include, for example, information contained in the document or information about the document itself, among other such information. The device can include other sensors for capturing information as well, such as at least one microphone 112 operable to capture audio data 114 or a position sensor for acquiring position data, among others.

In this example, the document 110 contains information that might be of interest to the user. This information includes, for example, a body of text, a phone number, and a web address. The user might want to acquire any or all of this information for any of a number of reasons, such as to update contact information, call the number, access a Web site associated with the address, and so on. In order to obtain this information, the user can position the computing device 104 such that at least the relevant portion of the document 110 is within a field of view 108 of at least one camera 106 of the computing device. The resulting image can then be displayed on a display screen 122 of the computing device, as illustrated in the example situation 120 of FIG. 1(b). The image 122 can be a still image that was captured by the camera, or can be a frame of a "live" view as captured by a video mode of the camera, etc. As illustrated, the image 122 can include information 124 from the document. Each instance of captured information can be referred to as a representation of an "object," which can be analyzed by software running on, or remote from, the device. In this example, the objects that can be recognized from representations of those objects in the image can include objects such as a string of text 126, a phone number 128, and a web address or URL 130. Various other types of objects can be recognized in other examples as discussed and suggested elsewhere herein. The image can be processed to attempt to recognize the text, which then can be utilized by the user for any of a number of different purposes.

Using a conventional approach, the user can cause the image to be captured and uploaded to a server that is capable of running one or more image recognition or analysis algorithms on the image to attempt to identify text within the image. This can include, for example, at least one optical character recognition (OCR) algorithm. Oftentimes, however, the image that is captured will not be of sufficient quality to recognize the object that is of interest to the user. For example, the image might be out of focus or blurry, or part of the image might be obscured. Further, sometimes the recognition algorithm will only be able to recognize a portion of the image, which may or may not include the portion that is of interest to the user. Since the user is uploading the image to a server, the user has to wait for the image to be uploaded and analyzed before determining whether the relevant information was recognized, and whether it was recognized properly. If not, the user must cause another image to be analyzed and hope that the desired result is returned. This process can be inefficient and potentially frustrating to a user.

Accordingly, approaches in accordance with various embodiments can provide an interface that enables a user to determine which objects have been recognized, such that the user can make near real-time adjustments in order to cause the device to recognize the object(s) of interest. Such an interface can indicate each such object that has been recognized, and can provide information about that object as applicable. Further, if that object is an actionable object, or a type of object with which an action is associated, for example, the interface can enable that action (or any of a number of associated actions) to be performed with respect to the object. In at least some embodiments, information for these actions can be retained or archived such that a user can cause that action to be performed whether or not a representation of the object is still recognizable by the device. This can include, for example, a situation where a representation is no longer in a field of view of a camera or detectable by a microphone or other sensor or component of the device. Such an interface can be provided as part of the operating system, as part of the camera software/hardware, or as part of an application sitting on top of the camera stack, among other such options.

Figure 1B:
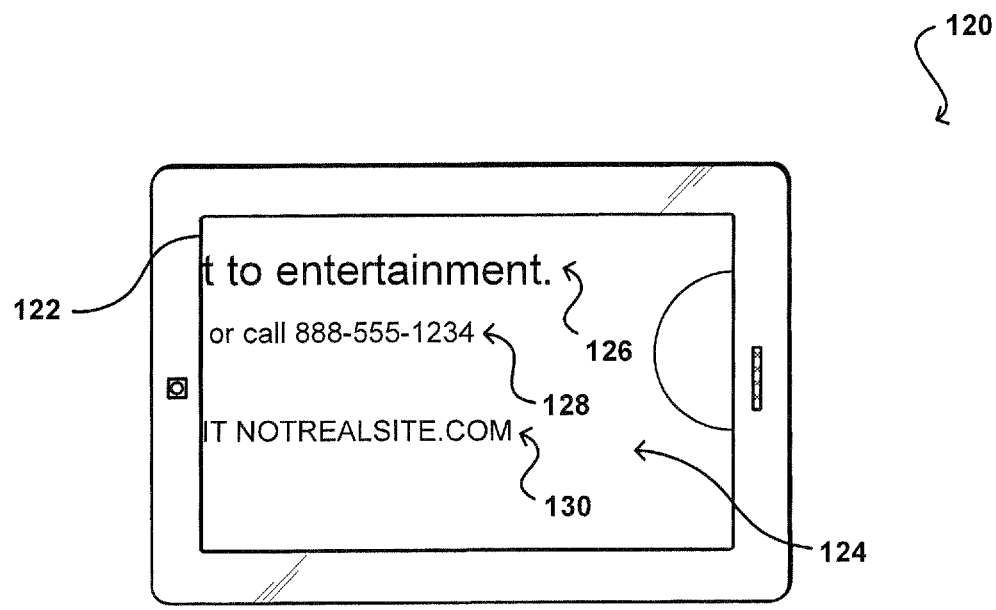
Figure 2A:
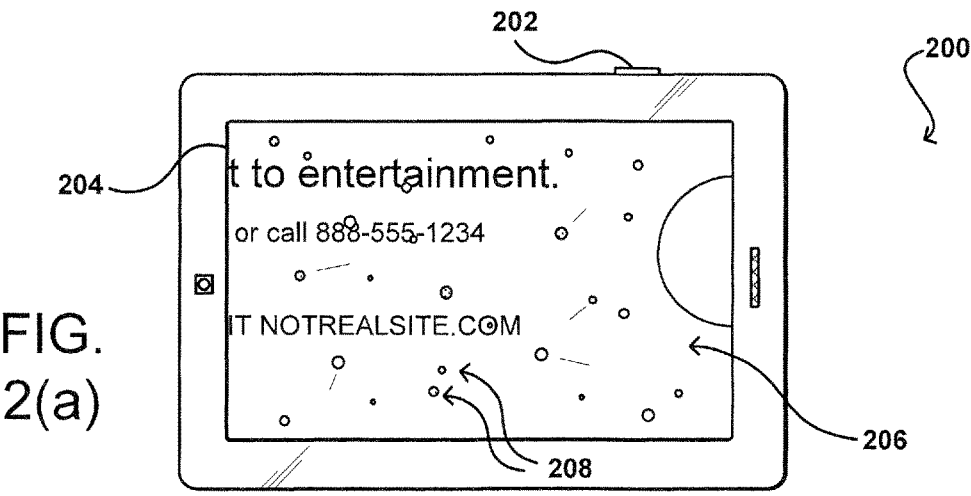
FIGS. 2(a), 2(b), 2(c), 2(d), and 2(e) illustrate an example interface that conveys to a user which objects are recognized in a current view, as well as actions that can be accomplished using those objects, that can be utilized in accordance with various embodiments.
Figure 2B:
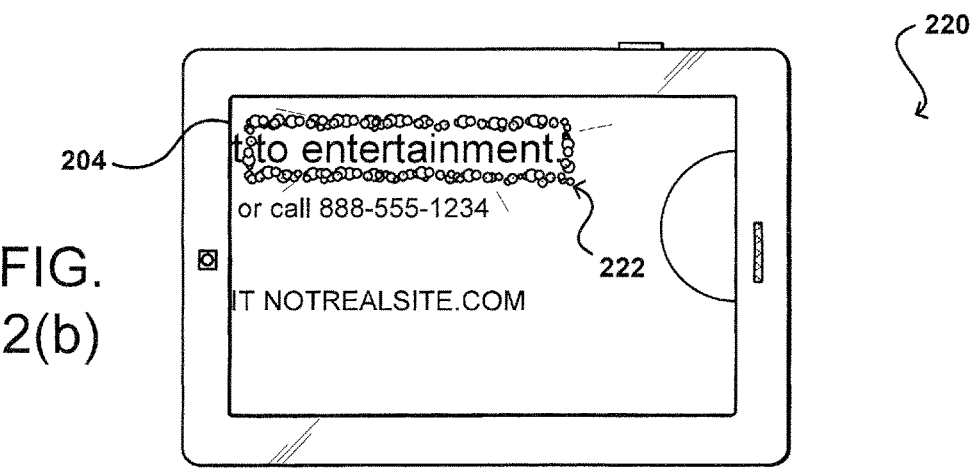
Figure 2C:
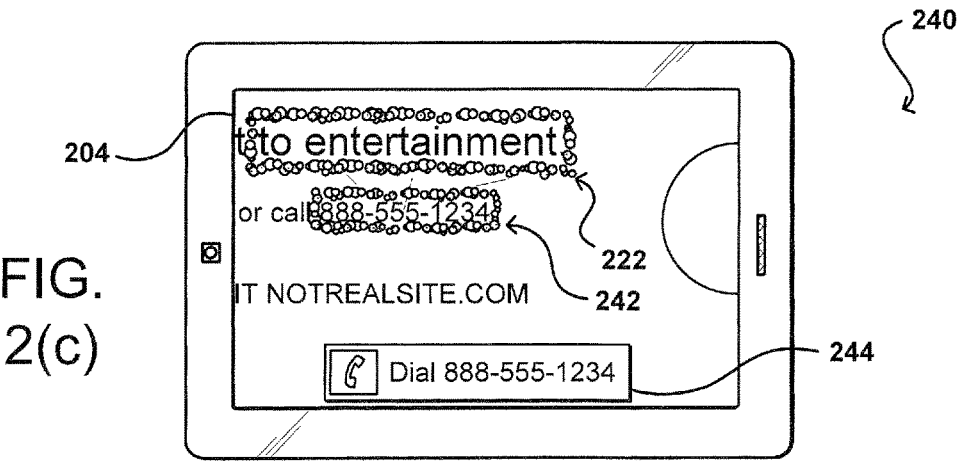
Figure 2D:
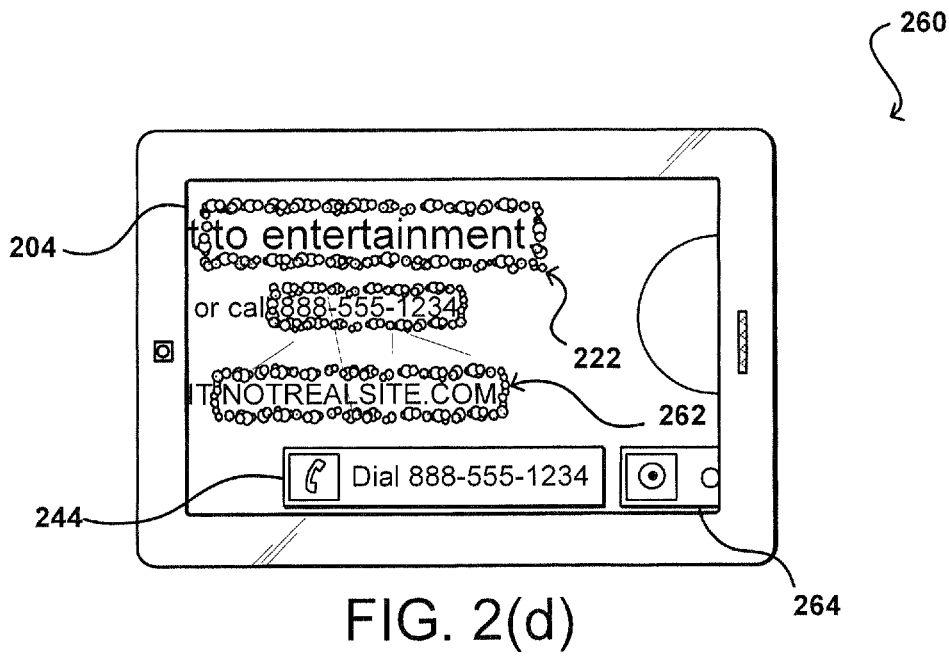
Figure 2E:
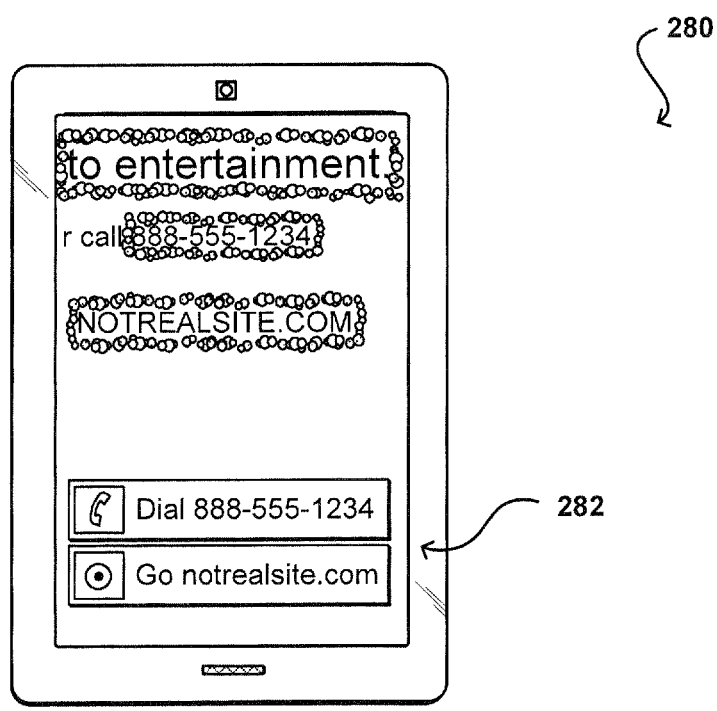

For example, FIG. 2(a) illustrates an example situation 200 wherein the portion of the image from FIG. 1(b) is again displayed as a live view of the document of interest to the user. In this example, however, the user is able to press a physical button 202, or provide another such physical or virtual input, to cause a recognition mode to activate on the device. It should be understood that other types of operation for recognition or other such purposes can be utilized as well, and that other activation mechanisms can be used or the recognition can be launched automatically, among other such options. In this example, the recognition mode uses what will be referred to herein as "fireflies" 208. The fireflies function as a set of virtual indicators that can "float" above a live camera view, still image, or other such content presented via a display 204 or other such element of the computing device. Fireflies can be used to communicate information to the user, such as whether the device is tracking objects properly or if tracking has been lost, whether or not objects are recognized, and/or whether the image is adequate to identify features in the image, among other such options. Each firefly can be a group of pixels that pulsate or alternate in brightness like a firefly, or can comprise an actual image or animation of a firefly, bulb, insect, or other such creature or object that can move about the screen. Various other objects, icons, images, animations, or graphics can be used as well within the scope of the various embodiments.

Some fireflies can be animated to move about the screen, while some can be caused to appear to flash in place, either once or a number of times. There can be a fixed number of fireflies on a screen at any given time, or a variable number that can depend on any of a number of different factors. There can be some fireflies that flash in place while other fireflies move, in order to give the impression of a group of living organisms without the impression of swarming or other motions that may be somewhat disconcerting to a user. In some embodiments, the fireflies can be small points or circles that flash from invisible or transparent to a bright white or yellow light, for example, similar to how fireflies light in nature. Other appearances can be used as well, along with different colors, sizes, brightness values, etc. In order to give a more natural appearance, different fireflies on the same display might also have different brightness levels, intensities, colors, distances, sizes, and the like. In at least some embodiments a user (or developer or application, etc.) can be enabled to change the appearance or behavior of the fireflies, among other such aspects. When entering a recognition mode, in at least some embodiments, any chrome or interface associated with the camera can be removed, reduced in size or scope, or otherwise modified to further indicate that the device has entered a different mode of operation. In at least some embodiments, the audio of the device can also be adjusted when fireflies perform different operations, such as to emit a louder buzzing noise when moving or emit little to no buzzing when a bounding box is created.

In at least some embodiments, the fireflies can be animated, rendered, or otherwise caused to appear to act with at least some level of intelligence. For example, as illustrated in FIG. 2(a), while no part of the image information 206 has been recognized, the fireflies can be caused to relatively randomly move or hover about the screen (as completely random movement may not appear natural). There can be some related behavior among the movements in at least some embodiments to give the impression of a group of intelligent creatures. While the fireflies are moving about the display, for example, the computing device (or a computer in communication with the computing device) can analyze at least a portion of the image and/or video to attempt to recognize one or more objects represented in the image, or "visual representations" of the corresponding objects contained in the image. For example, the text string "to entertainment" might be recognized by an OCR engine or other such component or process. In response to recognizing that object, some or all of the fireflies can be rendered to form an animated shape, such as by being animated to appear to move across the display and form an animated bounding box 222 proximate the representation of the recognized object. The fireflies in the animated shape can be animated to change in motion and/or appearance, such as by changing in brightness and/or intensity, as well as to change in an amount or type of motion. In some embodiments, fireflies can be animated in a first state when no information is to be conveyed and a second state when information is to be conveyed, where the first and second states can vary in aspects such as maximum brightness, average intensity, color range, average brightness, density, flashing rate, and the like. As mentioned, some of the fireflies might appear to move and some might just appear near the representation of the object in order to prevent the appearance of swarming in at least some embodiments. The result of the fireflies creating a bounding box 222 around the string of text can indicate to the user that the text has been recognized, at least as a string of text or recognizable object. If the user is interested in this text, the user can then take an appropriate action, such as by touching the display 204 near the text or bounding box in order to perform an action such as to copy the text. If the fireflies had not appeared around the text, but instead moved relatively randomly about the display, the user could determine that the image was not sufficient for the device to recognize the text and could perform an action such as to move the camera, move the object, adjust the lighting, change the zoom or focus, etc.

In some embodiments, different recognition algorithms and/or services might be used to recognize different types of objects. For example, a string might be recognized as text that matches a determined pattern, such as a pattern indicating the text is a phone number or URL. Accordingly, information for these objects might be processed by a different algorithm or process. The different types of processing therefore can result, in at least some embodiments, in different objects being recognized at different times. Similarly, different objects might be recognized at different times due to changes in the image that enable different portions to be recognized at different times, among other such options.

In response to a second object being recognized, a portion of the fireflies (either from the first bounding box 222 or additional fireflies, or a combination thereof) can be caused to create a bounding box 242 or other such indication about the second recognized object, here a phone number. In at least some embodiments, some of the fireflies can be animated to move from the first bounding box 222 to the second bounding box 242. Such presentation can indicate to the user that both objects have been recognized and/or identified. In different embodiments, the fireflies can bound the phone number at different times, such as when the string is identified as a text string, when the string is identified as a phone number, or when information for the phone number is located, among other such options. Various approaches can be used to attempt to recognize and identify objects, as well as to determine the types of those objects and applications or actions that correspond to those types of objects, as is known or used in the art. For example, various computer vision algorithms can be used to attempt to locate, recognize, and/or identify various types of objects in an image or video sequence. Computer vision algorithms can utilize various different approaches, as may include edge matching, edge detection, recognition by parts, gradient matching, histogram comparisons, interpretation trees, and the like.

In various embodiments, a type of the object can also be determined. In at least some embodiments, this can include at least an "actionable" or a "non-actionable" type, or equivalent(s). For example, a text string such as "to entertainment" might be a portion of text that can be handled as normal text, such as for copying and pasting, which might not be considered an actionable object in at least some embodiments (while being considered actionable in others). Objects such as a phone number or URL might be considered to be actionable objects as the computing device can perform at least one specific function with respect to each of these objects that might be of interest to a user. For each actionable object, or at least one recognized actionable object, the interface can provide a user-selectable input or element associated with that actionable object. In other embodiments, a user-selectable input or element might be provided for each recognized object, or a specific subset of recognized objects, among other such options. Objects such as barcodes and QR codes might be considered either actionable or not actionable objects in different embodiments. Similarly, objects such as songs might be considered actionable if the software is linked to a song identification and/or purchasing source, and text might be considered actionable if a translation is available.

In various embodiments, the user-selectable element can take the form of what will be referred to herein as a "ribbon" 244, although various other types of elements or objects can be utilized as well within the scope of the various embodiments as discussed and suggested elsewhere herein. In this embodiment, a ribbon 244 is comprised of at least two parts: information about the object and information about the action that can be taken. As illustrated, the ribbon can list the phone number that was recognized, such that the user can determine whether the phone number was properly recognized before using the number. The ribbon can also identify the action that can be taken, in this case using a phone icon and including the word "dial," although various other indications can be used as well. In some embodiments the user might be able to select from different options or cause a specific action to be associated with a type of object, such as where a user would like to send a text or make a Skype® video call instead of a conventional phone call, among other such options. In some embodiments, a ribbon might have two touch targets: a first target that comprises approximately 80% of the area of the ribbon that enables the user to select the primary action, and a second target of approximately 20% of the ribbon area that enables the user to go to a detail card, or other such element, that provides other actions or plugins applicable to that object, as well as potentially a copy of the image that was used to recognize the object for context, among other such possibilities. As discussed, a ribbon in some embodiments can include at least three things to display: an image relating to the object, a title or name of the object, and a source of disambiguation, such as an author or artist name to help a user distinguish that object from other objects with the same or similar names or titles, etc. Ribbons (or other user-selectable elements) can also provide different actions for various types of objects. For example, a ribbon can include an action to purchase or download a song that was recognized from audio data, or to play a movie that was recognized from audio data and/or video data captured by one or more sensors of the device.

In this example, the ribbon is displayed near the "bottom" of the display for the current orientation, although other places can be utilized as well. In at least some embodiments, the ribbon 244 can remain on the screen for at least a determined period of time, whether or not the corresponding representation of the object is still visible in the display or otherwise accessible to the device. For example, a user might point the camera towards the number in order to have the phone number accessible via the device. Once captured and/or recognized, the user might no longer want to continue to hold the device with the number in the field of view of the camera, and might want to bring the camera to a more comfortable position in order to touch the ribbon or otherwise check and dial the number. In some embodiments, the user might want the device to store the number to dial at a later time that is more convenient for the user. In any of these or other such cases, it can be desirable for the device to display the ribbon for a period of time, or at least enable the user to access the ribbon at the appropriate time.

As illustrated in FIG. 2(*d*), the device might recognize additional actionable objects as well, such as by using additional algorithms, plugins, services, or processes or when the portion or quality of the captured image changes, among other such options. In this example, another actionable object is detected, which causes an additional bounding box 262 to be created by the fireflies. Since the object is actionable, an additional ribbon 264 can be created that enables the user to cause a specific action to be performed with respect to the newly recognized object. In this example the first ribbon is displayed in a center portion of the display with additional ribbons added to the right, although in other embodiments the newer ribbons can be presented in the center and can be animated to appear to "push" the older ribbons to the right or left, among other such options. In order to access the other ribbons, then, the user can swipe, scroll, or otherwise navigate to those ribbons using any of a number of navigational approaches used for such purposes.

As illustrated in FIG. 2(*e*), the ribbons 282 can also be stacked vertically, among other such options. In this example, the first ribbon appears on top with the others appearing below, while in other embodiments the most recently generated ribbon can always appear on top, among other such options. As new ribbons are generated and the number of ribbons exceeds the number of ribbons that can be displayed, as may be a fixed, variable, or user-configurable number, for example, the older ribbons can be "pushed" off screen, but available to the user via one or more navigational approaches as discussed elsewhere herein. Various other approaches for displaying, moving, and navigating ribbons or other selectable elements can be utilized as well within the scope of the various embodiments.

In at least some embodiments, the fireflies can be displayed with one or more different characteristics, such as may be used to convey different types of information to a user. For example, FIG. 3(*a*) illustrates an example situation 300 wherein one of the recognized objects is a phone number. There might be several different cases where that particular number might be of interest to highlight to the user, as may specify one or more specified criterion as discussed elsewhere herein. For example, the number might correspond to an entry in the user's contact list or a connection through a social network. The number also might be a number that the user has dialed before, or that the device has previously identified. In still other embodiments, the user might frequently use the recognition mode to recognize phone numbers to dial, such that this might be the object that is currently of most interest to the user. For any of these or other such reasons, it might be beneficial to somehow make the bounding box 302 for this object stand out from the others. In the situation 300 illustrated, the fireflies making up the bounding box are larger than those for the other bounding boxes. This can communicate to the user that this object may be more important than the other objects, for any of the reasons listed above. In some embodiments, larger fireflies could be used to communicate one of the specific situations mentioned above, among others, as may be specified by the user. In addition to size, aspects such as different brightness levels, different "distances" from the user, different densities of fireflies, differences in flashing speed, or other such metrics can be used with fireflies as well to communicate any of these or other notifications to the user.

In some embodiments, fireflies can also utilize different colors to communicate different types of information. For example, in the situation 320 of FIG. 3(*b*) one of the bounding boxes 322 is composed of fireflies that are of a different color than those used to form bounding boxes around visual representations for other recognized objects. The difference in color can represent any appropriate difference, such as any of those listed above. Further, color might be used to specifically convey information in a way that might be at least somewhat familiar to a user. For example, as with URLs, links or numbers that have not previously been dialed or followed might be represented in a first color, such as blue, while links or number that have previously been utilized by the user might be represented by another color, such as purple. Similarly, security information might be conveyed to a user via the fireflies. If, for example, if a link has been analyzed (by the device or a remote system or service) and has been determined to satisfy at least one safety criterion, the fireflies around that link might be green.

If there is some potential danger with respect to that link, the fireflies might be yellow or red. If a link is determined to be unsafe, the fireflies might appear red or might not create a bounding box around that URL at all. In some embodiments, fireflies coming into contact with a potentially unsafe object can appear to die off, such as if coming into contact with a bug zapper, to indicate the danger of the object while improving the amusement factor of the interface for at least some users. For example, the fireflies coming into contact with a visual representation of an object can appear to stop and drop off the bottom of the screen, although animations, flashes, and buzzing noises or other audio adjustments can be used as well in accordance with various embodiments, as may be configurable, selectable, or downloadable by a user. In some embodiments, the fireflies might hover around the URL but not create a standard bounding box, in order to communicate that the fireflies are at least aware of the URL. For example, in the situation 340 of FIG. 3(c), the fireflies will not create a bounding box around any of the visual representations. This could mean, in different embodiments and/or situations, that the objects were not recognized, the objects have been deemed to be unsafe, or the objects have been blocked or otherwise blacklisted by the user. In some embodiments, this can indicate to the user that the image is not sufficient or is blurry due to movement of the camera, such that the fireflies are not able to settle on any of the visual representations of the objects in the view.

Figure 3A:
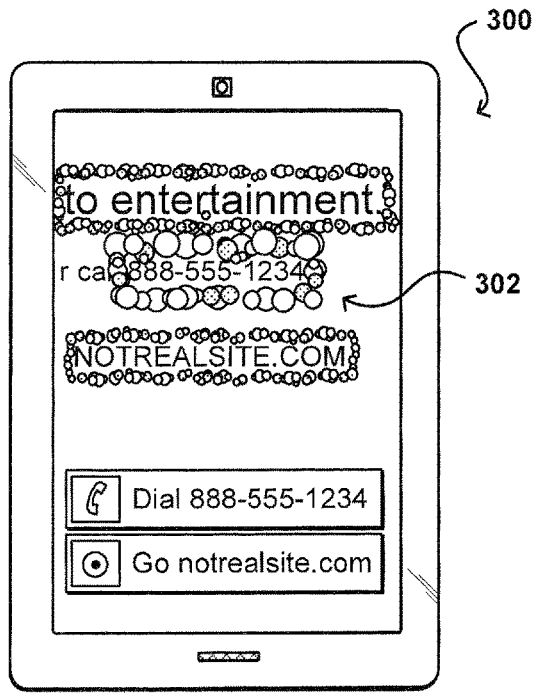
FIGS. 3(a), 3(b), 3(c), and 3(d) illustrate an example interface wherein graphical elements such as fireflies can be used to communicate various types of information in accordance with various embodiments.
Figure 3B:
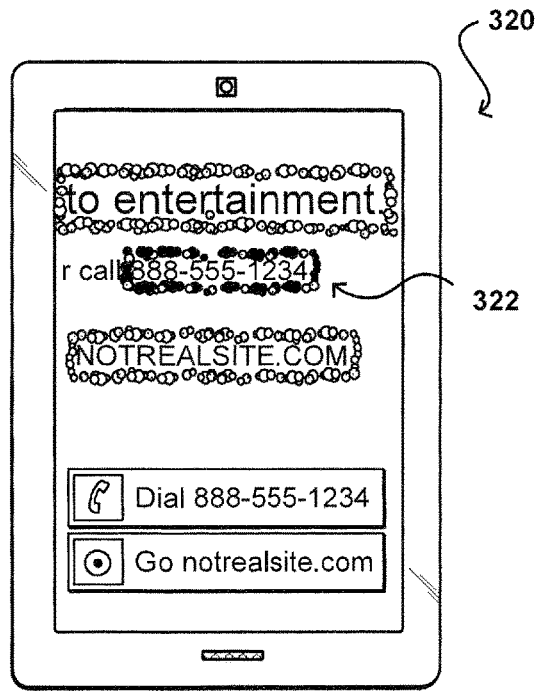
Figure 3C:
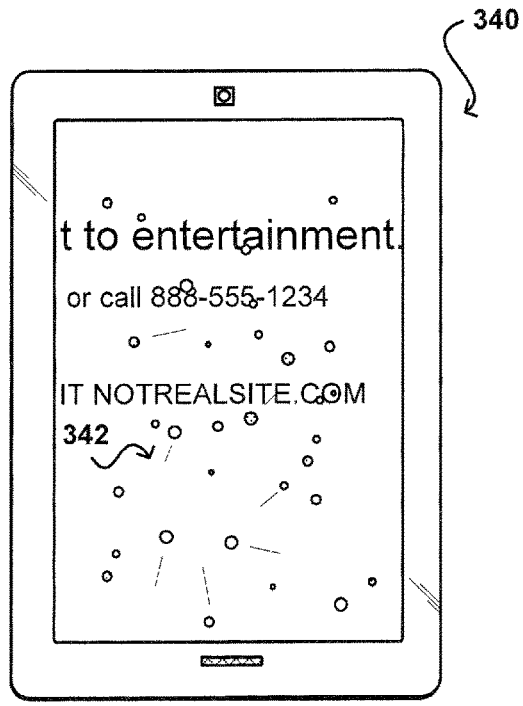
Figure 3D:
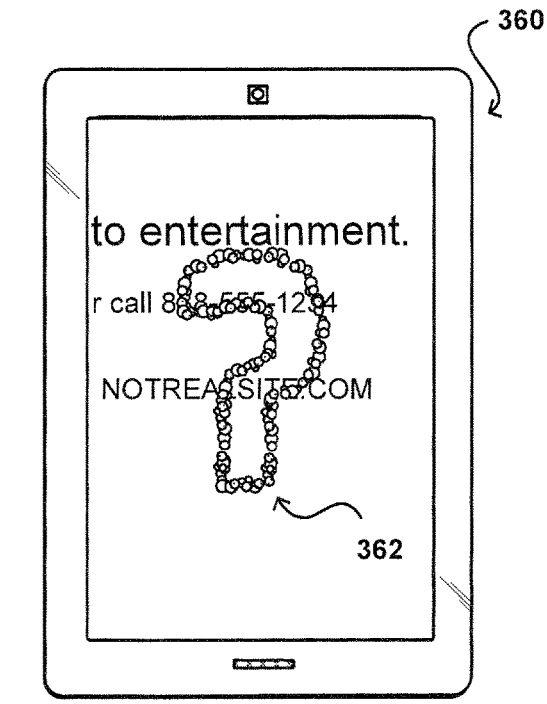

In some embodiments, when a user want to reset the recognition process the user can "shake" or otherwise move the device, where the motion can be detected by a motion sensor such as an inertial sensor, gyroscope, or accelerometer, for example. The shaking motion can "shake" the fireflies off the representations of the recognized objects, which can cause them to fly and/or flash about for a period of time, as illustrated in FIG. 3(c). In some embodiments, some of the fireflies can be animated to appear to "hit" the screen in order to hopefully provide a more interesting and/or amusing user experience. Such a process can be used to indicate that the user did not approve of what the device recognized, and would like the device to try again. This could be used when, for example, the user wanted a different sub-string of the text recognized as an object, or wanted a different action selected for an object. For example, if the device recognizes a phone number and suggests a dial action, and the user shakes the device, the device can attempt to try another suggestion, and can instead suggestion an action to perform a video call or text message to that number, among other such options.

In some embodiments, the device might not be able to recognize any objects, such as where the image is too dark or blurry, or where there is nothing of interest in the image. In other cases, the device might not be able to determine any additional or alternative objects or actions for a live view. In such an instance, the fireflies in at least some embodiments can be configured to form a question mark 362 or other such symbol, such as is illustrated in the example situation 360 of FIG. 3(d). Upon receiving such a symbol, the user can be aware that he or she might need to make certain adjustments or changes, such as to move the camera, change a zoom level, change an amount of ambient light, etc. Similarly, such a symbol can communicate to the user that the device is unable to recognize and/or identify any of the objects in the view, such that the user might have to take another approach to obtain the desired information. In some embodiments, such a symbol can be used to communicate that the objects were recognized, but no results or matching information were found. Various other approaches can be used as well within the scope of the various embodiments.

In order to clarify the information being communicated, while avoiding the need for text in at least some embodiments, specific symbols can be used to communicate at least some of these and other messages to the user. These can be two- or three-dimensional images, for example, formed by fireflies of the same or different types. For example, as illustrated in the configuration 400 of FIG. 4(a), the fireflies can be configured to form an animated flashlight 400 or other such animated shape in order to convey to the user that additional light is needed. This can convey to a user that the user should try to move the object into better light, or try to not block as much light. This also can convey to the user that the user should activate the flash under current conditions. In some embodiments, the flashlight image formed by the fireflies can actually form a selectable element, such that the user can touch (or otherwise select) the image on a touch screen (or other element) of the device to cause the flash to be activated or illumination to otherwise be provided. In some embodiments, selecting the image created by the fireflies can at least bring up an option to provide at least one type of illumination for the subsequently captured video and/or image(s). In some embodiments, a flash can be activated and a frame of video corresponding to the flash analyzed to attempt to identify one or more objects instead of continually illuminating the scene, in order to conserve battery power and/or conserve energy.

In the configuration of FIG. 4(b), the fireflies have formed an image of an exclamation point 410. This can be used to convey urgent information to the user. For example, a recognized object might be identified as an unsafe or blocked object. The object also might be identified to be in violation of a privacy or decency policy. In some embodiments, the image might be used to convey that there is an urgent message that might be unrelated to the live camera view, such as the device about to run out of power, an urgent message being received, and the like. In at least some embodiments, the user can select the image in order to receive more information about the notification, and potentially take an appropriate action. In various embodiments, the image formed by the fireflies, whether a bounding box or another such shape, can create a user-selectable element that enables the user to receive additional information, perform a related action, or otherwise perform a specific task. If, for example, the interface is being displayed on a smart watch the exclamation point can be used to indicate to the user that the user is exceeding a recommended heart rate, and selecting the image can enable the user to obtain instructions or an updated workout plan to help bring the heart rate back to within a recommended range.

For example, in FIG. 4(e) the fireflies form an image of a Wi-Fi symbol 420 indicating that a data connection was lost and the user might want to try to establish a new connection. In some embodiments, the fireflies can form a Wi-Fi access icon in response to determining that the wireless functionality of a computing device is disabled, such that detection of the touch event enables the wireless functionality to be enabled. In FIG. 4(d) the fireflies form an image of an ear 430 to indicate that the device is detecting audio that can potentially be recognized and/or identified. Similar objects or configurations can be used as well, such as a musical note, a musical instrument, fireflies that flash to the beat, a specific pattern such as snow falling from the top of the display, etc. In FIG. 4(e), the fireflies form an arrow 440 that can be used to direct the user's attention to a specific element, representation of an object, or other such location. This can be used, for example, to cause the user to select an option, such as to turn down the volume, activate a flash, change a camera mode, etc. This can also be used to inform the user to move the camera or otherwise make an adjustment so the device can recognize a particular object, such as where the recognition or identification process is almost, but not quite, at the minimum confidence level to recognize an object. An arrow can also be used to direct the user's attention to an icon indicating an amount of battery life, an incoming call, and the like. Various other options can be used as well. In some embodiments, an image such as the light bulb 450 of FIG. 4(f) can be used to indicate that the device has a specific suggestion or recommendation for the user. In at least some embodiments, the user can select the light bulb image to obtain information about the recommendation, among other such actions. An image such as a magnifying glass might be used to indicate that the device needs to have the focus adjusted, and the user can select the magnifying glass to cause the device to refocus. If the interface is being used in a vehicle, an image of a traffic sign or caution sign might be displayed if there is traffic or an accident ahead, and the user can select that option to get directions around the area. If the interface is on a television, maybe an image of a character or television is displayed to let the user know that one of the user's favorite shows is on, and the user can select that image to cause the television to switch to that channel.

Figure 6A:
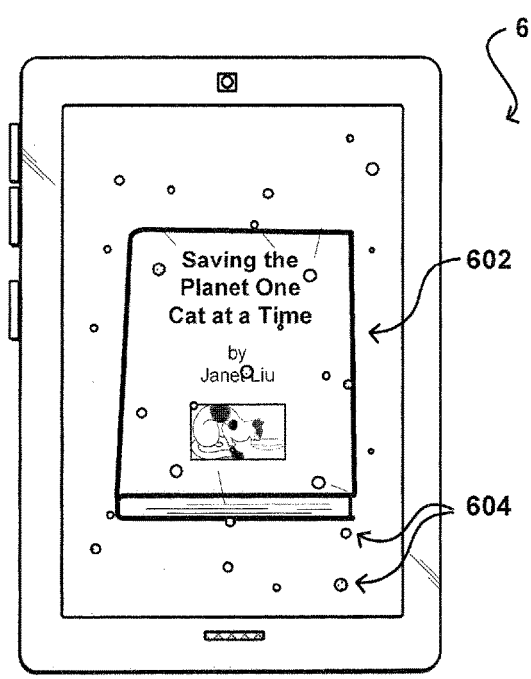
FIGS. 6(a), 6(b), 6(c), and 6(d) illustrate an example button configurations can be used to provide information to a user in accordance with various embodiments.
Figure 6B:
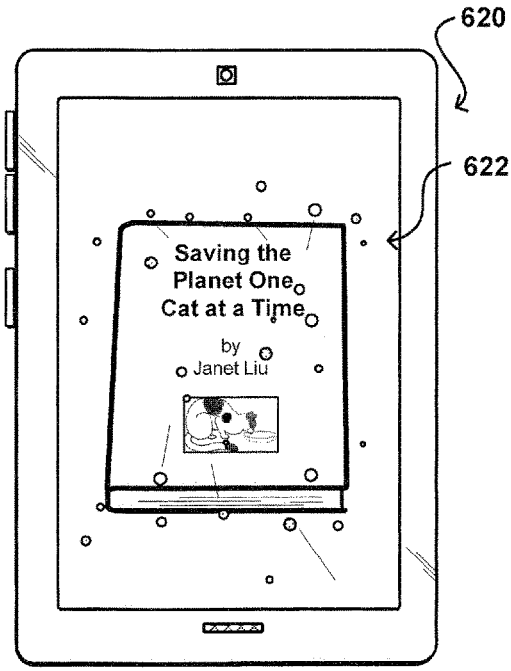
Figure 6C:
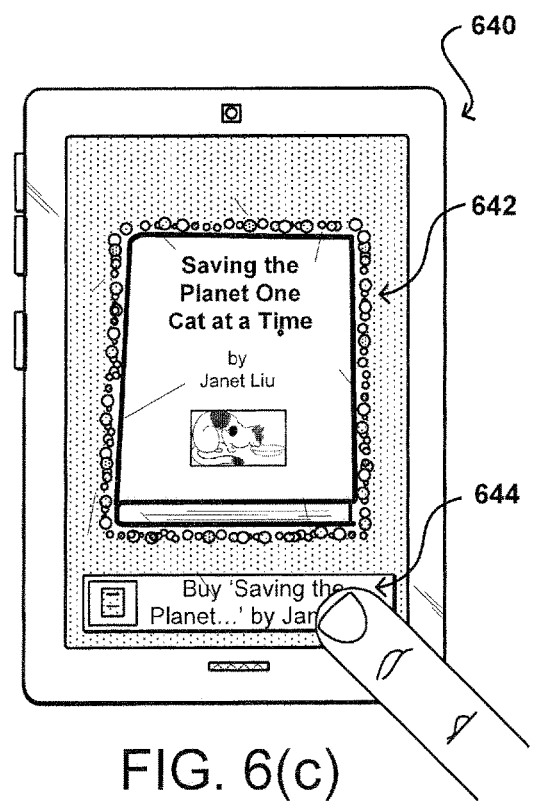
Figure 6D:
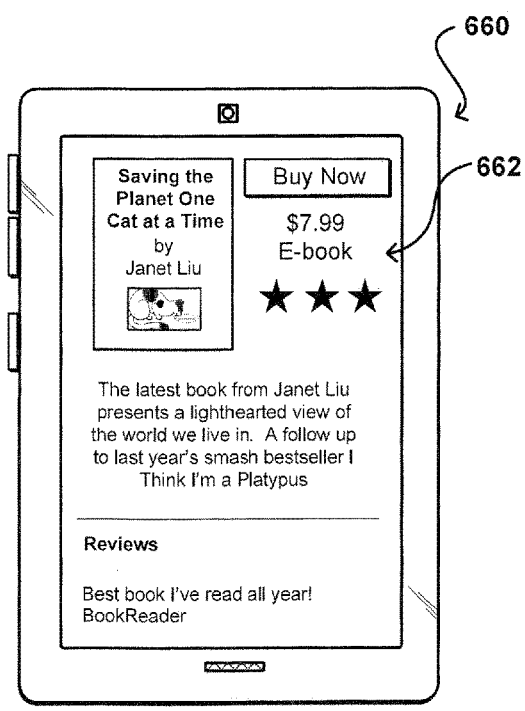

The fireflies themselves also can take various forms. As discussed, any appropriate graphical elements can be used. For example, as illustrated in FIG. 6(a), the graphical elements 600 can take the form of small points, circles, or spheres, which can change in color, size, intensity, density, or other such aspects. For three-dimensional displays, the spheres also can appear to be at different depths, and can appear to follow three-dimensional paths. As illustrated in FIG. 6(b), the graphical elements 620 can appear as stars, flashes, or bursts. In FIG. 6(c), the graphical elements 640 can be animated bugs, or other such elements, that can fly or flash across the display. Various other such elements can be used as well within the scope of the various embodiments. In at least some embodiments, a user might be able to modify or configure the type of fireflies used for a particular device, purpose, or mode. For example, a person using their device in work mode might select small, point-like fireflies while children might select larger, animated fireflies with moving wings. The types of fireflies might also vary by application or device, and in some embodiments users can download or create other types of fireflies as well.

FIGS. 6(a) through 6(d) illustrate another example interface that can utilize fireflies and ribbons to enable a user to perform an action with respect to a recognized object in accordance with various embodiments. In this example, as illustrated in the situation 600 of FIG. 6(a), a user might be interested in obtaining information about a particular item, in this case a book 602. As discussed elsewhere herein, the user can have (or place) the device in a discovery mode, or otherwise have the camera capturing image information that can be analyzed to attempt to recognize visual representations of one or more objects in a field of view of the camera. In this case, an image of the book 602 is captured by the camera and the image is displayed in the live view on the display of the computing device. As mentioned previously, the device can display a group of fireflies 604 that, at least initially, can move or flash about the display screen at relatively random (or at least somewhat scattered) fashion. In some embodiments, one or more algorithms executing on the device can begin to locate features in the live view that might correspond to recognizable objects. As discussed, these can include things like edges, transitions, end points, and other features or aspects that can be used for tasks such as computer vision and image recognition as known or used in the art. In the example situation 620 illustrated in FIG. 6(b), at least some of the fireflies 622 can begin to move towards at least some of these features as they are identified. For example, since the edges of the book will likely be detected as potential recognizable features, at least some of the fireflies 622 can begin to move and/or appear near the edges of the book. Such an approach can provide the impression that the fireflies are intelligent and are attempting to identify representations of objects in the image. Such an approach also can provide feedback to the user as to the features the device is identifying, in case a representation of an object in which the user is interested is not "attracting" fireflies, whereby the user can know to adjust the view, focus, lighting, or some other aspect to attempt to improve the recognition. Once an object is identified, the fireflies can move to create a bounding box 642 or other indication about a representation of the recognized object, as illustrated in the example situation 640 of FIG. 6(c). In some embodiments, as illustrated, other portions of the live view can appear to darken, change in color or brightness, or otherwise be modified to further highlight the portion of the image that corresponds to a recognized object. In this example, the object was identified as a book available for purchase, whereby a ribbon 644 is displayed on the display screen. The ribbon in this example includes an image of the book, as may be obtained from a product data store, and the ability to purchase or obtain additional information about the book. In this example, the user is able to select the ribbon 644 to cause the device to navigate to a web page 662 that enables the user to purchase a copy of the book, as illustrated in the example situation 660 of FIG. 6(d). If the user had already purchased a copy of the book in electronic form, for example, the ribbon could instead provide an action that, when selected, causes the e-book to be displayed in an e-book reader application, for example. Various other actions can be taken as well.

In many instances, as mentioned, there can be multiple actions that can be taken. For example, a phone number might be used for text messaging, a voice call, or a video call. If a URL contains a foreign word, actions might include opening the URL in a Web browser or translating the word. Various other actions can apply as well. Accordingly, in at least some embodiments the types of action may be selectable by a user, or the algorithms for suggesting these actions might be ranked or otherwise prioritized. For example, an object being recognized as a URL might always take precedence over the object being identified to contain a foreign term, as the user will be more likely on average to want to follow the URL than to translate it. In some cases, such as where a user can make a voice, video, or VoIP call, for example, the device might analyze the user's historical usage or present the user with options or preferences, for example, that can determine which action to provide to the user in a ribbon. In at least some embodiments, the ribbon can contain an option that enables the user to view other available actions, and select one or more of those actions to be performed.

In order to provide at least some of the functionality discussed herein, in at least some embodiments an amount of image processing (or pre-processing) can be performed on the computing device. For example, the detection of unique or interesting features or characteristics can be performed on the device, in order to determine whether there is sufficient data to warrant sending an image (or data extracted from the image) to a remote server. In some embodiments, there can be an amount of pattern matching performed on the device to determine whether the features likely correspond to a representation of a recognizable object, in order to cause the fireflies to move to that location before a full recognition is done and/or image data is sent to a server. Further, basic pattern matching can help the device to determine a likely type of object, such as whether the object is a body or string of text, a QR code, etc. The behavior and/or characteristics of the fireflies then can change as appropriate before data is sent to and/or received back from a server, reducing the lag time experienced by users of the device. Similarly, if a quick match on the device can identify an object as something already recognized, for which there is data stored on the device, the fireflies can use a color, shape, and/or size appropriate for that object, for example, and a corresponding ribbon can be presented without need to contact a remote server or service, etc. In at least some embodiments, the fireflies can appear to learn over time, as historical usage data can be used to help prioritize and/or select actions based on typical user performance, among other such information.

In some embodiments, a device can attempt to obtain information based on a current location of the device, as may be determined using a GPS component, electronic compass, or other such sensor or approach. If other devices have recognized and/or identified objects at that location, even pointing in a similar direction, then the device can attempt to have the fireflies act based upon what the device anticipates it will find before any or all analysis is completed. For example, if the user is in a movie theater and there are several movie posters on the wall, the device can know (based on information from other devices obtained that day or over a recent period) what the user is likely to encounter, and can pre-fetch that data and/or have the fireflies act based on the expected encounter(s). If fireflies for recognized movie posters are typically large animated ones for this user, the presence of such fireflies can also indicate to the user that the user can obtain information about the movie posters at that location. In at least some embodiments, prefetching the result data can prevent similar images from being repeatedly uploaded and analyzed, thereby conserving bandwidth and processing capacity.

In some embodiments, a user can configure the colors, sizes, shapes, animations, and/or other aspects or characteristics of the fireflies, at least for some purposes or types of objects. In some embodiments, a user can download or purchase various types of bugs or other graphical elements to be used in the place of the fireflies, or can generate their own firefly elements. In at least some embodiments, application developers can utilize the firefly functionality within an application, and can specify one or more aspects of the firefly behavior within that application. For example, in a Yelp® application where the primary color is red the fireflies could be red, while in a Facebook® application where the primary color is blue the fireflies could be blue. Users also can have the option of turning off the fireflies, as well as changing or limiting their functionality. As discussed, sounds can be used with the fireflies and specific firefly actions, and the user can choose to customize or deactivate these sounds as well in various embodiments.

Figure 7:
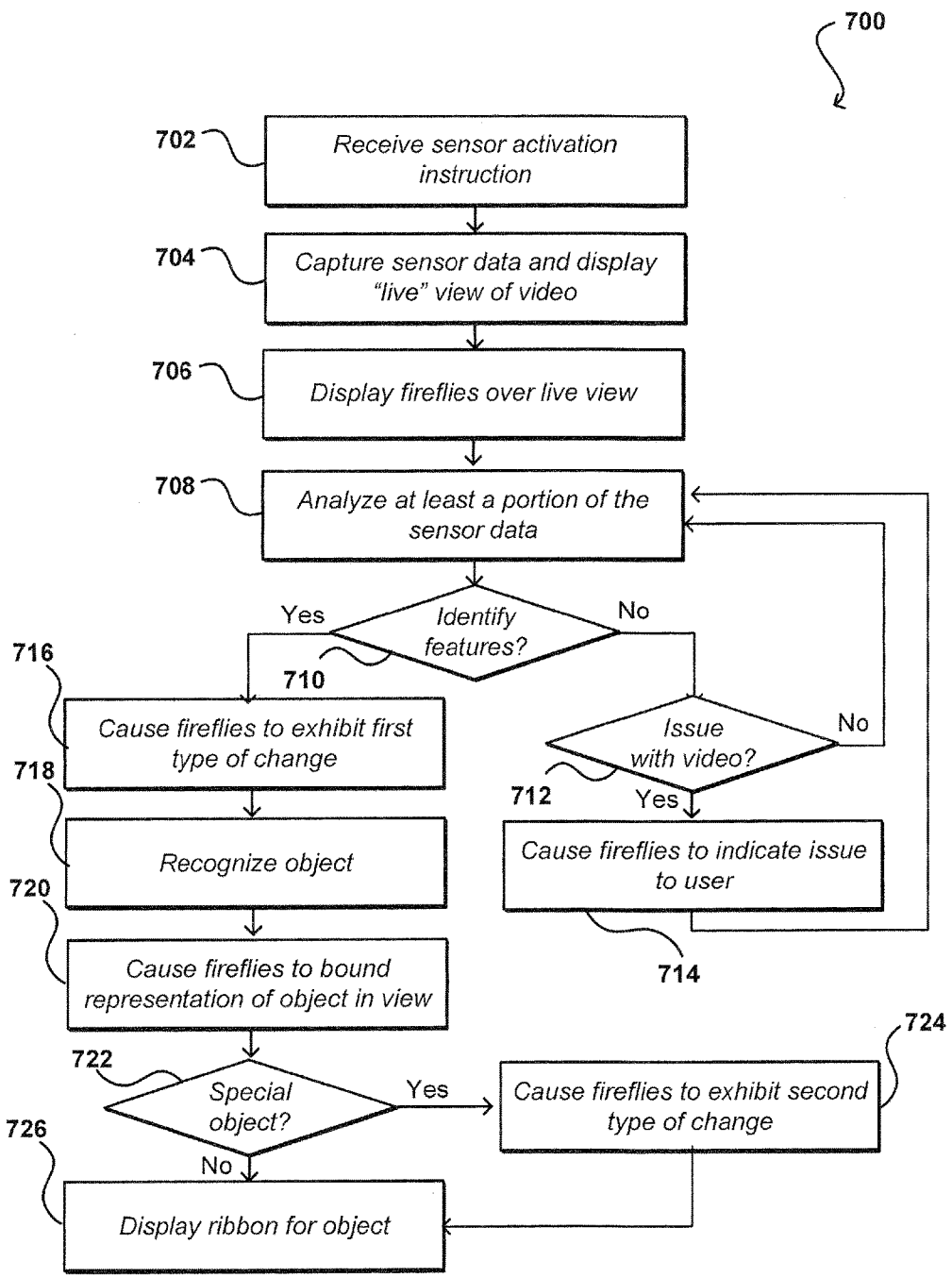
FIG. 7 illustrates an example process for communicating information using graphical elements, such as fireflies, in accordance with various embodiments.

FIG. 7 illustrates an example process 700 for animating graphical elements utilized for user notification and other such tasks that can be utilized in accordance with various embodiments. It should be understood that, for any process discussed herein, there can be additional, fewer, or alternative steps performed in similar or alternative orders, or in parallel, within the scope of the various embodiments unless otherwise stated. In this example, a sensor activation instruction is received 702. This can be a hardware or software instruction generated automatically on a computing device containing the camera, an instruction generated in response to a user input, or another such instruction. In response, the device can capture 704 or otherwise acquire sensor data and display a "live" view of acquired video data (or another series, set, or stream of image or other such data) on a display of the device, where the live view corresponds to the view of a selected camera as indicated by video data captured by that camera and then displayed, with relatively little delay, on a display screen of the device. It should be understood that the "live" view can have a slight delay due to the time needed to capture, read, and provide the data for display. A number of fireflies can be displayed 706 over the live view. The fireflies can be animated to appear to move relatively randomly across the screen. As indicated, this can include some fireflies that are animated to move across the display and some fireflies that appear to disappear in one place and reappear in another when they subsequently flash. Various other options can be utilized as well. While the fireflies are moving about the screen, the device (or a system or service in communication with the device) can analyze 708 at least a portion of the captured sensor data to attempt to recognize one or more representations of objects in the sensor data, using any of the approaches discussed or suggested herein for such purposes.

As discussed, in some embodiments a level of preprocessing can be done on the device to attempt to identify 710 one or more features contained in the sensor data. This can include, for video data, regions such as edges or sharp transitions that are likely to correspond to recognizable objects. For audio data, this can include beat or other such patterns. If such features are identified, the fireflies can be caused 716 to exhibit a first type of change. In some embodiments, the fireflies can be animated to appear to move towards, or hover around, the identified features. For audio features, the fireflies might start flashing or moving to the beat. Various other changes can be utilized as well. If no features can be identified, a determination can be made 712 as to whether there are any issues with the captured sensor data, such as whether the video is too blurry or too dark, whether there is too much ambient noise, etc. If no such issues are identified, the process can continue to analyze the sensor data to attempt to identify features and/or objects. If there are any such issues, at least a portion of the fireflies can be caused 714 to attempt to indicate the issue to the user. This can include, for example, forming an animated shape that indicates to the user that the user should activate illumination, try to hold the device still, focus the camera, etc.

During the analysis process, at least one object can be recognized 718 by analyzing information from the representation of each object in the sensor data. In response, at least a portion of the fireflies can be caused 720 to indicate recognition, such as by bounding the visual representation or the object or forming an animated shape with respect to the live or displayed view of the video. As discussed, this can include being animated to cause the fireflies to flash or "hop" in a pattern corresponding to a bounding box or other such shape. A determination can be made 722 as to the type of object, such as whether the object satisfies one or more specified criterion for that object to be considered a "special" object with information that can be communicated to the user. For example, a specified criterion might include that the object corresponds to information in a user contact or address book, an object that the user has previously visited, an object that the user has identified as being of interest, or is an object that is potentially unsafe, among other such options. For any of these special objects, the fireflies can be caused 724 to exhibit a second or other type of change, such as to be displayed with a particular color, brightness, size, speed, flashing frequency, shape, motion, etc. Further, if the object is determined to be an actionable object, special or not, a ribbon or other user-selectable element can be displayed 726 on the device, which can enable the user to perform at least one specific action with respect to the object. As discussed, in at least some embodiments ribbons can be displayed for each recognized object, or a specified subset of the objects, among other such options. As the representations of recognized and/or identified objects are no longer contained in the sensor data, the fireflies can again disperse and can move about the display at least as long as the device is in the recognition mode. As used herein, fireflies can be "dispersed" across the screen by causing the fireflies to appear to scatter or disseminate in a random or semi-random fashion, such that fireflies are present over a relatively large portion of a display screen or other such element, and there is little to no grouping of fireflies or other such graphical elements until an object is recognized or information is otherwise to be conveyed to a user. For flashing fireflies this can include flashing in different random locations. For animated fireflies this can involve moving in relatively random directions. Various other approaches can be utilized as well. As discussed, in some embodiments the dispersing is controlled to some extent to prevent the appearance of bunching or swarming, for example, as well as to prevent other content from being obscured by the fireflies. The fireflies, in response to a representation of an object no longer being contained in the sensor data, can also be caused to return to having a set of default characteristics. These can vary by embodiment and selection, and can include, for example, a default color, brightness level, appearance, type of motion, rate of motion, and the like. Characteristics in the set can be modified or set by the user, an application, the device, or another such source.

Figure 8A:
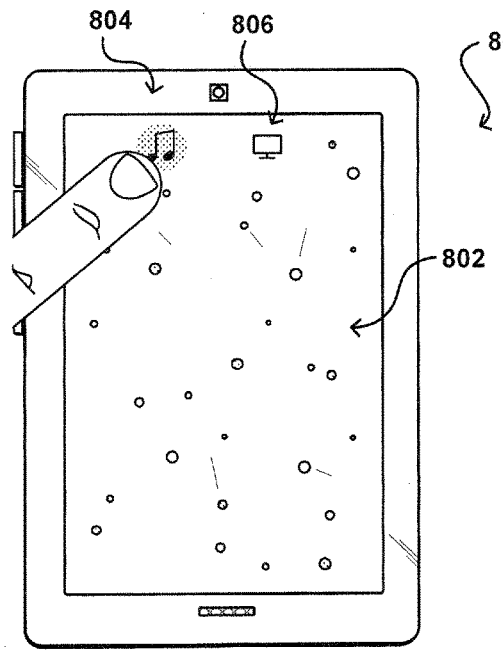
FIGS. 8(a), 8(b), 8(c), and 8(d) illustrate an example interface approach for audio recognition that can be used in accordance with various embodiments.
Figure 8B:
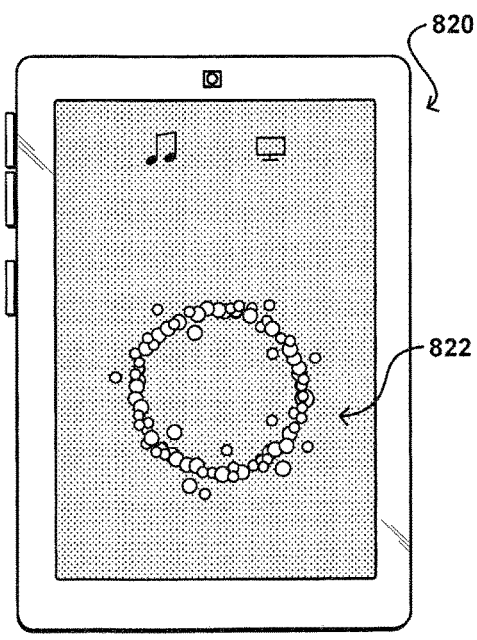
Figure 8C:
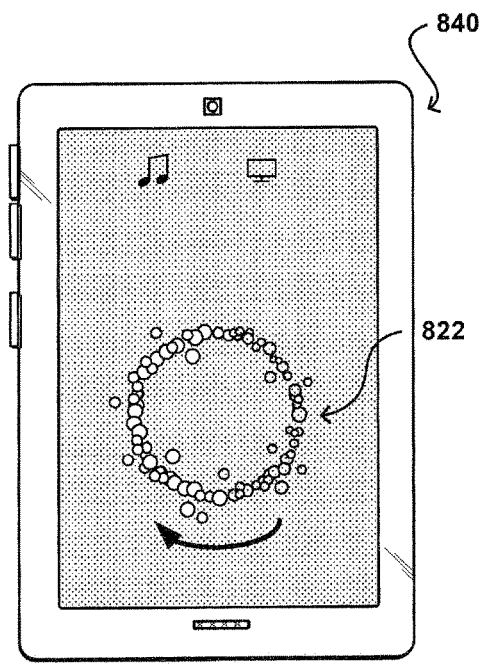
Figure 8D:
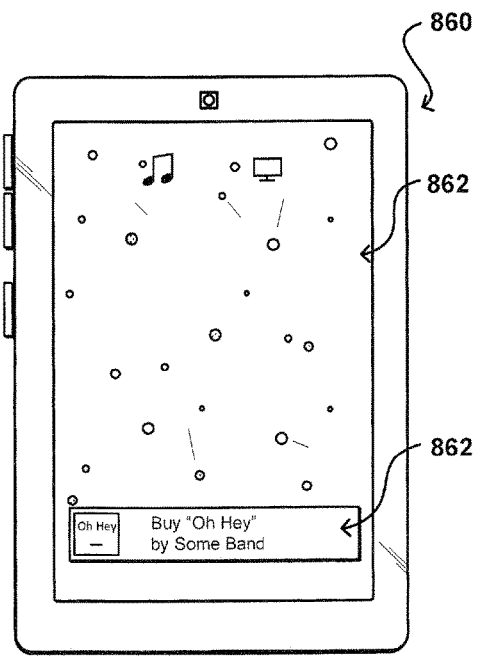

As mentioned, in at least some embodiments a device can attempt to identify audio objects, such as songs playing within a detectable range of a computing device. In some embodiments, a computing device might analyze both audio and video at any time the device is in recognition mode. Such an approach can utilize a significant amount of processing capacity, memory, battery power, and other such resources, such that it can be desirable in at least some embodiments for a user to set the appropriate mode in order to conserve resources, particularly for portable computing devices. In the example situation 800 of FIG. 8(a), there are two user-selectable icons 804, 806 that enable a user to manually switch between operational modes, although various other approaches can be utilized as well. In this example, a user is able to select the audio icon 804 to cause the device to enter an audio recognition mode, or to otherwise begin analyzing audio captured by the device. As illustrated in FIG. 8(a), the fireflies might start in a dispersed fashion, as discussed elsewhere herein, but might form an animated circle 822 or other shape to indicate that the device is in recognition mode, such as is illustrated in the example situation 820 of FIG. 8(b). Users may generally be familiar with symbols such as circles or hourglasses that rotate, indicating that the user should wait while processing is occurring. In this example, the fireflies can be animated in a first state, which might include flashing with a certain average brightness, size, shape, color, or height, for example. The fireflies can increasingly be animated in a second state around the circle as the processing proceeds, where the second state can differ in the average brightness, size, shape, color, height, etc. The second state can also vary in the type, direction, or amount of motion of the fireflies, such that the fireflies seem more or less lively when moving from the first state to the second state. For example, the fireflies might be of a certain brightness and size as illustrated in FIG. 8(b). Starting at the top of the circle and going in a clockwise direction, for example, the fireflies can decrease in size and brightness to indicate that the audio capture and/or audio analysis is being performed but results have not yet been obtained, as in some embodiments the analysis might be performed after the acquisition period is complete. Various animation characteristics can be altered to indicate the passage of time, such as to dull or brighten an increasing number of fireflies, cause an increasing portion of the fireflies to appear to rest or die off, cause an increasing portion of the fireflies to appear to come to life, etc. The fireflies can also appear to "hop," such as by changing the apparent height or depth to give the impression of motion in two or three dimensions. The fireflies can also appear to "sink into" or "come out of" the display over time, such as while sensor data is being analyzed. For example, as the time period elapses, the fireflies can be rendered to appear to go further and further into, or out of, the screen in the z-direction. Various other animations or motions can be used to indicate the passage of time, where those animations or motions can occur in two or three dimensions and change to indicate time passing. The rate at which the fireflies change can depend at least in part upon a determined recognition period. For example, if the device can listen for twelve seconds to attempt to identify an audio track, then half of the fireflies 822 might have changed in size and shape after six seconds, as illustrated in the example situation 840 of FIG. 8(c). If, at any point in that twelve second period, the audio is identified with a sufficient level of confidence, a ribbon 862 or other user-selectable element identifying the audio, and potentially enabling the user to obtain a copy of the audio, can be presented, as illustrated in the example situation 860 of FIG. 8(d). If the audio is not recognized within that period in at least some embodiments, a ribbon or other such element or notification can be presented indicating that the audio was not able to be identified. Other approaches can be used as well, such as to use one of the shapes discussed with respect to FIG. 3(d) or 4(h).

In at least some embodiments, the fireflies might change in characteristics to indicate that an audio object has been identified by changing along with the acoustic fingerprint of the detected music. For example, the fireflies might flash along with the beat, or change in color along with the beat. In other embodiments, the fireflies might appear to "hop" to the beat (i.e., move in the z-direction) being rendered to appear closer to the top of the display screen on each beat. As time elapses, the portion of the fireflies representing the portion of time that has passed can appear to just rest in place towards the bottom (in z) without flashing to indicate which portion has passed. Various other animations or changes in characteristics can be used as well in various embodiments. Various other aspects of audio data can be used to identify music or other audio according to its acoustic fingerprint. For example, music can be identified based on harmonics, a treble pattern, another musical fingerprint, or any combination thereof. When analyzing audio, software on the device can attempt to determine that at least a portion or subset of the audio data is likely to correspond to a piece of music, portion of identifiable recorded audio, etc. In some embodiments, music identification mode can be a separate and/or distinct mode from other types of identification modes, such that the device can determine when to attempt to identify music versus speech or other such audio. In other embodiments, separate modes are not needed to recognize these and other types of objects.

Figure 9:
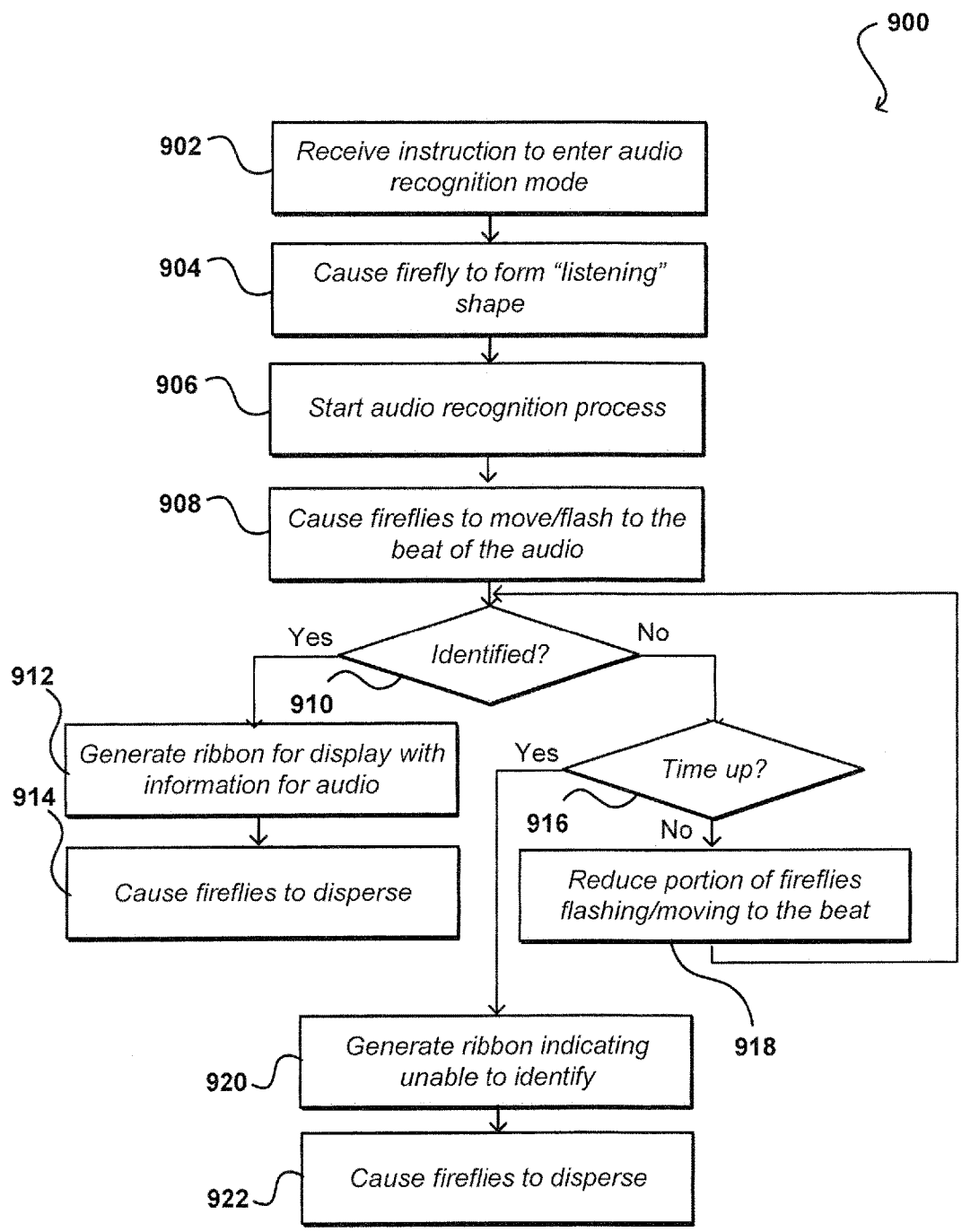
FIG. 9 illustrates an example process for communicating information using graphical elements, such as fireflies, in accordance with various embodiments.

FIG. 9 illustrates an example process 900 for recognizing audio, and conveying the recognizing to a user, that can be utilized in accordance with various embodiments. As discussed herein, such a process can also be used with the capturing of sensor data over a determined period of time, or according to another such temporal aspect. In this example, a recognition mode might already be activated on a computing device. Instructions can be received 902 to cause the device to enter an audio recognition mode. This can be in response to a manual selection by a user, an activation of an application or function, the detection of a pattern of audio, or another such action. In response to the instruction, the audio recognition mode, state, and/or functionality can be activated on the device. This can include, for example, causing 904 the fireflies to form a "listening" shape, such as an animated ring or circle of fireflies in an appropriate portion of a display screen, among other possible shapes. In conjunction with the forming of the listening shape, the device can start 906 and/or activate an audio recognition process, which as discussed herein can use one or more audio analysis and/or recognition algorithms or processes to attempt to recognized and/or identify the audio, such as to identify a particular song, movie, audio book, etc. In some embodiments, the audio recognition process might involve some pre-processing on the device, as with image analysis, along with a more robust analysis on, or remote from, the device. For example, the device might analyze the audio to attempt to determine a beat, frequency, or pattern to the audio that is indicative of recognizable audio. If such information is detected, a more robust analysis might be performed over a segment of the captured audio. The lack of such audio information can prevent a full analysis from being performed, in order to conserve resources on the device. If a beat or other set of audio features can be determined, for example, the fireflies can be caused 908 to appear to flash, move, or otherwise make some adjustment to the beat of the audio. For example, the fireflies in some embodiments can appear to "hop" or fly towards the display screen (along a z-direction) to the beat, then retract to a previous position between beats. The fireflies can also, or alternatively, alternate in size, shape, color, brightness, or another such aspect along with the beat, in order to communicate to the user that the device is analyzing the audio, and indicate which audio the device is analyzing. In this way, a user might be able to determine if other noise or audio sounds might interfere with the recognition of the desired audio.

If, during the analysis, the audio is identified 910 with at least a minimum or threshold level of certainty or confidence, for example, a ribbon or other user-selectable element can be generated 912 for display with information about the audio, along with other information such as where a user can purchase or otherwise obtain a copy or other information about the audio. Once the audio has been identified and the ribbon presented, the fireflies can again disperse 914 or otherwise be "released" to attempt to identify other objects or perform other appropriate tasks. In some embodiments, the fireflies are animated in a third state, such as a default state, when dispersed across the display.

If the audio is not yet identified, a determination can be made 916 as to whether a maximum allowable time for the audio to be recognized has passed. It should be understood, however, that in other embodiments the audio might continually be analyzed as long as the device is in a recognition mode or other such functional state. If the maximum amount of time has not yet been reached, the portion of fireflies that are flashing and/or moving (or otherwise adjusting) to the beat can be reduced 918. In some embodiments, as discussed, this includes an increasing number of fireflies moving from a first animated state to a second animated state, wherein the fireflies are animated to have a different average brightness, different amount of liveliness, etc. As discussed, in at least some embodiments this can involve the fireflies stopping motion or flashing in a clockwise direction around the ring of fireflies such that all the fireflies will stop moving at the time when the analysis period is finished, with half of the fireflies no longer adjusting when half of the period has passed. Various other approaches can be utilized as well. The process can continue until the audio is identified and/or recognized, or the maximum amount of time has passed (or a user stops or pauses the process, etc.). If the song is not identified within the allowable period in this example, a ribbon or other notification can be generated 920 for display that indicates to the user that the audio was unable to be identified. In addition, the fireflies can be caused 922 to disperse across the display as discussed above. Various other information might be communicated as well. For example, the audio quality might have been sufficient, but no match was found with an acceptable level of confidence. In other cases, the audio quality may have been insufficient, and information might be communicated to the user whereby the user can attempt to improve the audio quality and try again.

It should be understood, in light of the teachings and suggestions contained herein, that such an interface can be useful for various other applications as well. For example, the use of fireflies or other graphical elements to form a determined shape, such as a circle, and then change the appearance of those fireflies over time can be beneficial for any appropriate application or function where there is a desire or intent to convey the passing of some period of time. For example, such an interface can be used with a stopwatch or minute counter application, a clock, or other such timing applications. Further, functions that require the user to wait for some reason also can benefit from such an interlace or usage of graphical elements such as fireflies. Such functions can include, for example, connecting to Internet access, buffering media content, downloading content, and the like.

Figure 10:
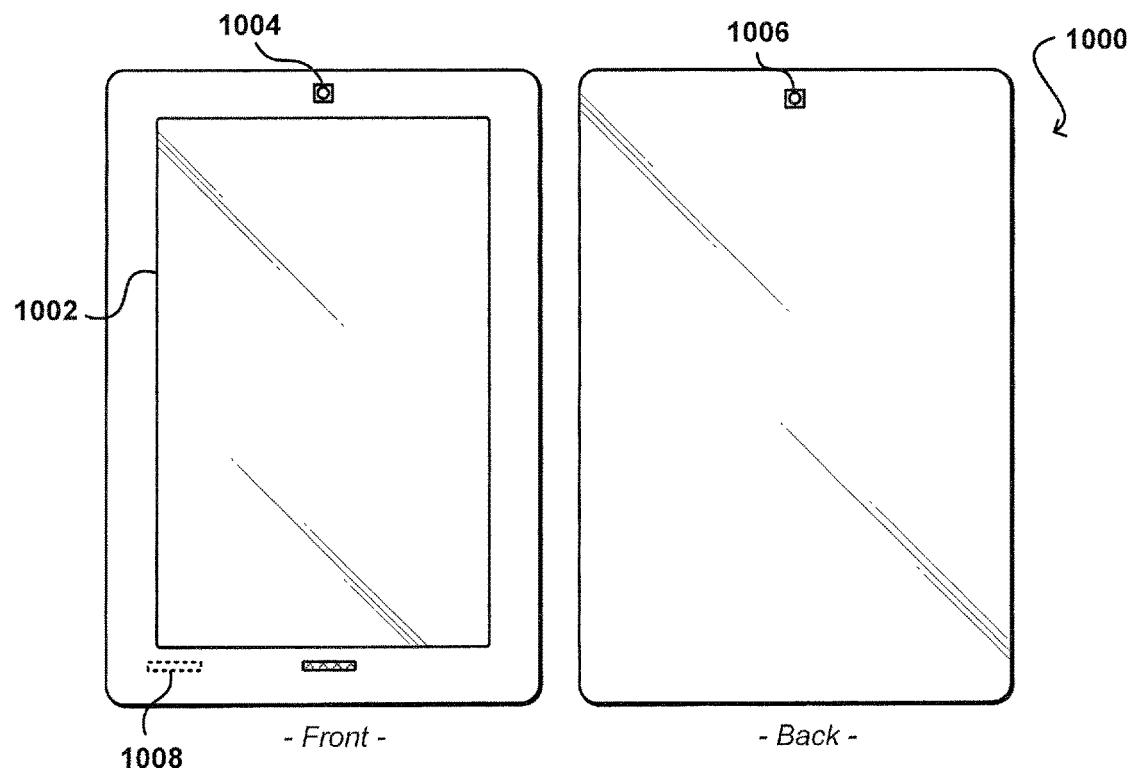
FIG. 10 illustrates an example computing device that can be used in accordance with various embodiments.

FIG. 10 illustrates an example computing device 1000 that can be used to perform methods in accordance with various embodiments discussed and suggested herein. In this example, the device has a primary display screen 1002 for displaying information and content to a user. The device also has two cameras 1004, 1006 positioned at the front and back faces of the device, respectively. It should be understood that fewer or additional cameras or other such image capture elements or sensors can be positioned at various other locations on such a device as well. In this example, each capture element is a camera capable of capturing image information over a visible and/or infrared (IR) spectrum, and in at least some embodiments can select between operational modes. It should be understood, however, that there can be fewer or additional elements of similar or alternative types in other embodiments, and that there can be combinations of cameras, infrared detectors, gesture sensors, and other such elements used with various devices.

In this example, a light sensor can be used to determine an amount of light in a general direction of objects to be captured. At least one illumination element, such as a white light emitting diode (LED) or infrared (IR) emitter, can be used to provide illumination in a particular range of directions when, for example, there is insufficient light as determined by the light sensor. In some embodiments, there can be an emitter for each of the image capture elements, with each emitter positioned proximate the respective image capture element. Various other elements and combinations of elements can be used as well within the scope of the various embodiments as should be apparent in light of the teachings and suggestions contained herein. The device can include at least one networking component 1008, enabling the device to communicate with at least one remote system or service, such as may be used to identify objects or obtain information relating to identified objects.

Figure 11:
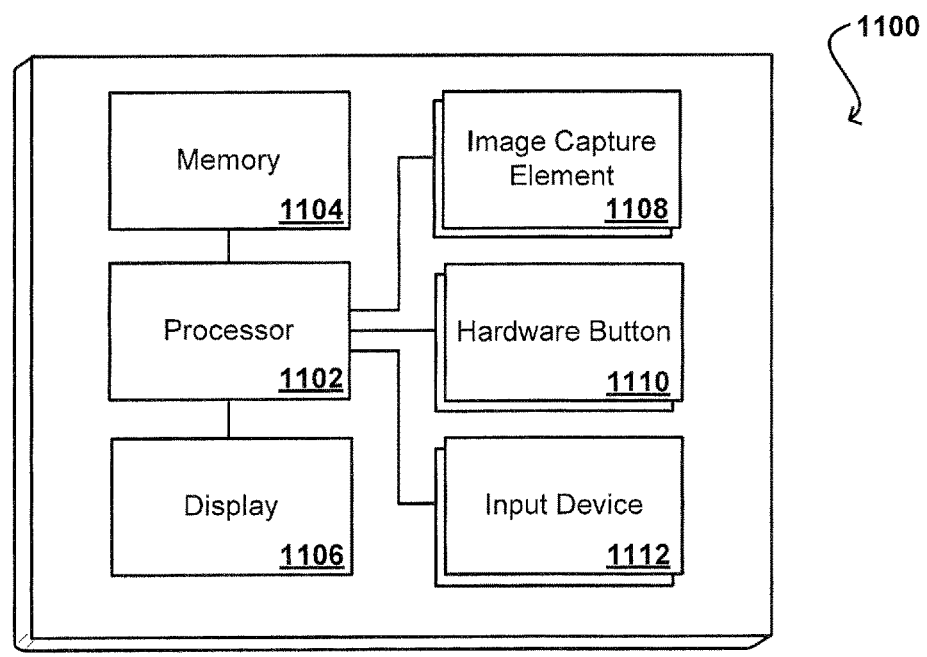
FIG. 11 illustrates an example configuration of components of a computing device such as that illustrated in FIG. 10.

In order to provide various functionality described herein, FIG. 11 illustrates an example set of basic components of a computing device 1100, such as the device 1000 described with respect to FIG. 10. In this example, the device includes at least one central processor 1102 for executing instructions that can be stored in at least one memory device or element 1104. As would be apparent to one of ordinary skill in the art, the device can include many types of memory, data storage or non-transitory computer-readable storage media, such as a first data storage for program instructions for execution by the processor 1102, the same or separate storage can be used for images or data, a removable storage memory can be available for sharing information with other devices, etc. The device typically will include some type of display element 1106, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least one image capture element 1108, such as one or more cameras that are able to image a user, people, or objects in the vicinity of the device. An image capture element can include, or be based at least in part upon any appropriate technology, such as a CCD or CMOS image capture element having a determined resolution, focal range, viewable area, and capture rate. The example device includes at least one orientation determining component 1110, such as an electronic gyroscope used to determine motion of the device for assistance in acquiring focused images. The device also can include at least one illumination element, as may include one or more light sources (e.g., white light LEDs, IR emitters, or flash lamps) for providing illumination and/or one or more light sensors or detectors for detecting ambient light or intensity, etc.

The example device can include at least one additional input device 1112 able to receive conventional input from a user. This conventional input can include, for example, a push button, touch pad, touch screen, wheel, joystick, keypad, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

Figure 12:
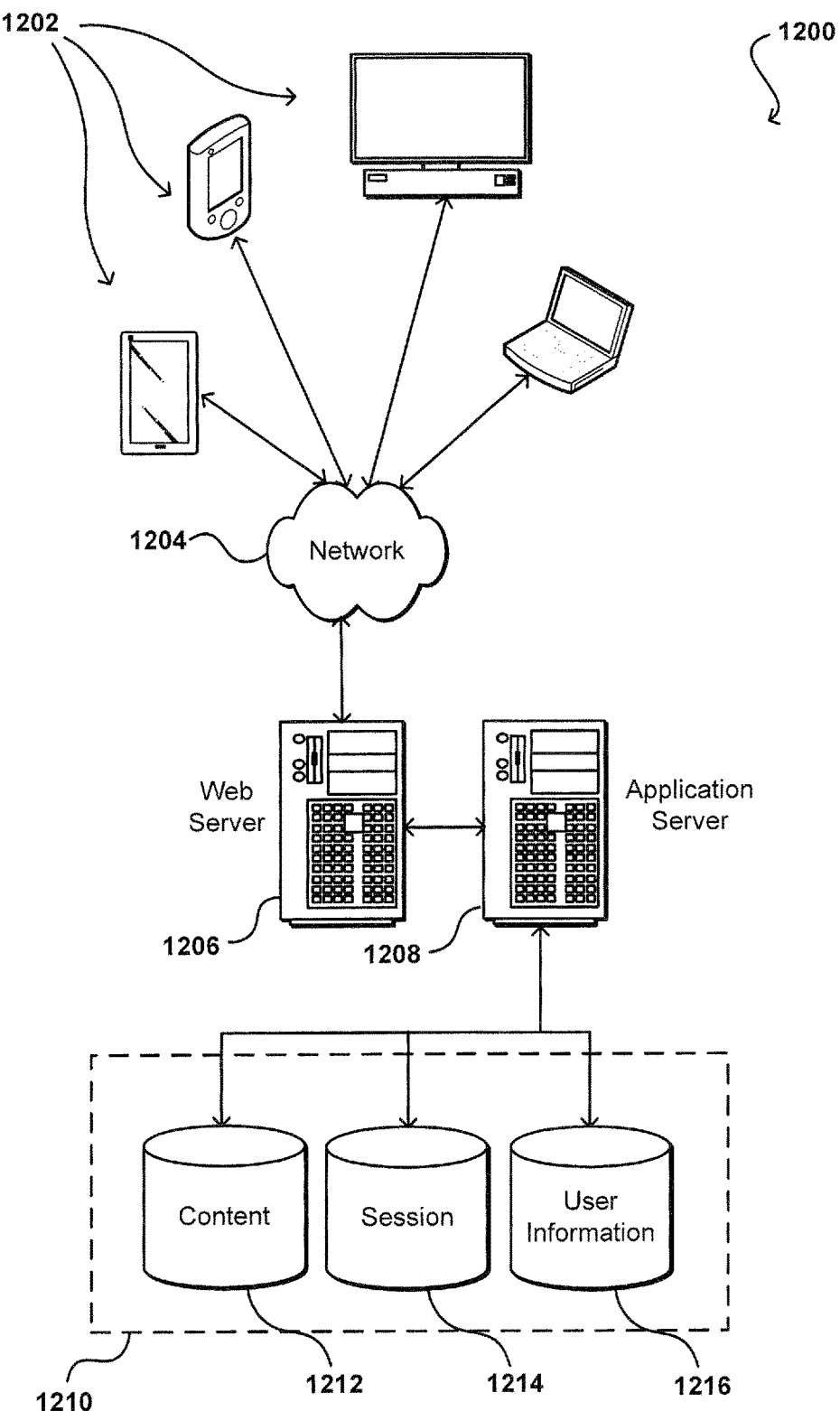
FIG. 12 illustrates an example environment in which various embodiments can be implemented.

As discussed, different approaches can be implemented in various environments in accordance with the described embodiments. For example, FIG. 12 illustrates an example of an environment 1200 for implementing aspects in accordance with various embodiments. As will be appreciated, although a Web-based environment is used for purposes of explanation, different environments may be used, as appropriate, to implement various embodiments. The system includes an electronic client device 1202, which can include any appropriate device operable to send and receive requests, messages or information over an appropriate network 1204 and convey information hack to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1206 for receiving requests and serving content in response thereto, although for other networks, an alternative device serving a similar purpose could be used, as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1208 can include any appropriate hardware and software for integrating with the data store 1210 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1206 in the form of HTML, XML or another appropriate structured language in this example. The handling of all requests and responses, as well as the delivery of content between the client device 1202 and the application server 1208, can be handled by the Web server 1206. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing content (e.g., production data) 1212 and user information 1216, which can be used to serve content for the production side. The data store is also shown to include a mechanism for storing log or session data 1214. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keypad, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a non-transitory computer-readable storage medium representing remote, local, fixed and/or removable storage devices as well as storage media for temporarily and/or more permanently containing, storing, and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer-readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD)

or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   at least one processor;
   a camera;
   a display screen; and
   memory including instructions that, when executed by the at least one processor, cause the computing device to:
      capture video data using the camera;
      present the video data via the display screen;
      present, via the display screen, graphical elements over the video data, the graphical elements being at least partially dispersed across the display screen;
      identify, in the video data, a representation of an object;
      cause one or more of the graphical elements to appear to move towards the representation to indicate that an object recognition process is being performed;
      determine a type of the object; and
      cause at least a subset of the graphical elements to form a shape, the shape being configured irrespective of an edge of the representation, the shape being unconfined with respect to a boundary of the representation.

2. The computing device of claim 1, wherein the shape conveys a functionality that the computing device is configured to perform in response to a touch event occurring on the display screen at a location corresponding to the shape.

3. The computing device of claim 2, wherein the instructions, when executed by the at least one processor, further cause the computing device to:
   determine wireless functionality of the computing device is disabled,
   wherein the at least the subset of the graphical elements are caused to form a Wi-Fi access icon based on determining the wireless functionality is disabled,
   wherein detection of the touch event enables the wireless functionality.

4. A computer-implemented method, comprising:
   capturing sensor data using at least one sensor of a computing device;
   presenting the sensor data via a display of the computing device;
   presenting, over the sensor data and via the display in a first time period, graphical elements;
   determining information to be conveyed via the computing device, the information being based at least in part upon the sensor data; and
   causing, over the sensor data in a second time period after the first time period and based on determining the information, at least a portion of the graphical elements to form a shape, the shape being configured irrespective of an edge of a representation of an object in the sensor data, the shape being unconfined with respect to a boundary of the representation.

5. The computer-implemented method of claim 4, wherein causing the at least the portion of the graphical elements to form the shape further comprises:
   causing a first subset of the graphical elements to move across the display; and
   causing a second subset of the graphical elements to flash in a first location and then flash in a second location to appear as if each graphical element in the second subset has moved across the display.

6. The computer-implemented method of claim 4, further comprising:
   identifying the representation in the sensor data; and
   causing at least a second portion of the graphical elements to indicate the representation has been identified.

7. The computer-implemented method of claim 6, wherein causing the at least the second portion to indicate the representation has been identified includes causing the at least the second portion to adjust at least one of a shape, a color, a brightness, an intensity, a rate of movement, a type of movement, or a flashing pattern.

8. The computer-implemented method of claim 4, further comprising:
   causing, based on the representation being absent from the sensor data, the at least the portion to disperse about the display and appear with a set of default characteristics.

9. The computer-implemented method of claim 4, wherein the shape conveys a functionality that the computing device is configured to perform in response to a touch event occurring on the display at a location corresponding to the shape.

10. The computer-implemented method of claim 4, wherein the shape corresponds to at least one of a question mark, an arrow, an exclamation point, a circle, a light source, an ear, a symbol, or a character.

11. The computer-implemented method of claim 4, further comprising:
   causing the at least the portion to move in three dimensions.

12. The computer-implemented method of claim 4, wherein the sensor data includes at least one of image data, video data, voice data, gesture data, position data, motion data, or audio data.

13. The computer-implemented method of claim 4, further comprising:
   causing, in addition to causing the at least the portion to form the shape, at least one of the computing device to emit a buzzing sound or the computing device to vibrate.

14. A computing device, comprising:
   a display;
   at least one processor; and
   memory including instruction that, when executed by the at least one processor, cause the computing device to:
      capture sensor data using at least one sensor of a computing device;
      present the sensor data via the display;
      present, over the sensor data and via the display in a first time period, graphical elements;
      determine information to be conveyed via the computing device, the information being based at least in part upon the sensor data; and
      cause, over the sensor data in a second time period after the first time period and based on determining the information, at least a portion of the graphical elements to form a shape, the shape being configured irrespective of an edge of a representation of an object in the sensor data, the shape being unconfined with respect to a boundary of the representation.

15. The computing device of claim 14, wherein the graphical elements are of a type selected from a plurality of different types of graphical elements stored on the computing device.

16. The computing device of claim 14, wherein the instructions, when executed by the at least one processor, further cause the computing device to:
   adjust, of the at least the portion, at least one of a color, brightness value, intensity value, size, or shape.

17. The computing device of claim 14, wherein the instructions, when executed by the at least one processor, further cause the computing to:
   cause the at least the portion to move at different depths of a three-dimensional view presented via the display.

18. The computing device of claim 14, wherein the instructions, when executed by the at least one processor, further cause the computing device to:
   receive audio data from the sensor data; and
   determine an acoustic fingerprint in the audio data,
   wherein the shape indicates the audio data is being analyzed.

19. The computing device of claim 18, wherein the instructions, when executed by the at least one processor, further cause the computing device to:
   cause, based on the acoustic fingerprint, the at least the portion to adjust at least one of a brightness level, a color, a size, or a height at which the at least the portion is presented.

* * * * *